(12) United States Patent
Lin et al.

(10) Patent No.: US 10,884,470 B2
(45) Date of Patent: Jan. 5, 2021

(54) METHOD AND SERVER FOR MANAGING POWER SUPPLY DEVICES

(71) Applicant: KWANG YANG MOTOR CO., LTD., Kaohsiung (TW)

(72) Inventors: Chen-Sheng Lin, Kaohsiung (TW); Chia-Cheng Tu, Kaohsiung (TW); Jen-Chiun Lin, Taipei (TW); Po-Yu Chuang, Taipei (TW); Yuh-Rey Chen, Taipei (TW); Te-Chuan Liu, Taipei (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 25 days.

(21) Appl. No.: 16/287,831

(22) Filed: Feb. 27, 2019

(65) Prior Publication Data
US 2019/0278352 A1  Sep. 12, 2019

(30) Foreign Application Priority Data

Mar. 7, 2018  (TW) .............................. 107107601 A (51) Int. Cl.
*G06F 1/28*  (2006.01)
*H02J 7/00*  (2006.01)
*B60L 50/50*  (2019.01)

(52) U.S. Cl.
CPC ................ *G06F 1/28* (2013.01); *B60L 50/50* (2019.02); *H02J 7/007* (2013.01); *H02J 7/0047* (2013.01); *H02J 7/0068* (2013.01); *H02J 2207/10* (2020.01)

(58) Field of Classification Search
CPC . G06F 1/28; B60L 50/50; H02J 7/0047; H02J 7/0068; H02J 7/007
USPC ....................................................... 340/693.1
See application file for complete search history.

(56) References Cited

U.S. PATENT DOCUMENTS

| | | | | |
|---|---|---|---|---|
| 2008/0157722 A1* | 7/2008 | Nobutaka | ............. | H02J 7/0047 320/137 |
| 2008/0281732 A1* | 11/2008 | Yamada | ................ | H01M 10/48 705/30 |
| 2012/0262111 A1* | 10/2012 | Soong | .................. | G07F 15/005 320/109 |
| 2013/0262002 A1* | 10/2013 | Braun | ...................... | H04Q 9/00 702/63 |
| 2015/0149015 A1* | 5/2015 | Nakano | ................... | B60L 53/65 701/22 |
| 2016/0267579 A1* | 9/2016 | Toya | ...................... | H02J 7/0021 |

(Continued)

FOREIGN PATENT DOCUMENTS

EP  2634889 A1 *  9/2013  ............ B60L 3/0046

*Primary Examiner* — Eric Blount
(74) *Attorney, Agent, or Firm* — Christensen O'Connor Johnson Kindness PLLC (57) ABSTRACT

A system for managing power supply devices includes a server including a database and a server end processing module. The server end processing module is configured to receive an alteration request from a user end electronic device and an alteration-confirmation signal from a service end electronic device, and send a confirmation response to the service end electronic device based on the received alteration request and alteration-confirmation signal in order for the service end electronic device to enable a target power supply device to update data stored therein.

8 Claims, 7 Drawing Sheets

(56) References Cited

U.S. PATENT DOCUMENTS

2017/0103235 A1* 4/2017 Shimma ............... G06F 1/3212
2018/0253788 A1* 9/2018 Takatsuka ........... H01M 10/441

* cited by examiner

METHOD AND SERVER FOR MANAGING POWER SUPPLY DEVICES

CROSS-REFERENCE TO RELATED APPLICATION

This application claims priority of Taiwanese Invention Patent Application No. 107107601, filed on Mar. 7, 2018.

FIELD

The disclosure relates to management of power supply devices for use in carrier devices, and more particularly to management of binding relationships between power supply devices and carrier devices.

BACKGROUND

With people's growing environmental awareness, electric vehicles (EVs) have been developed and are gaining public attention.

Conventional electric vehicles use rechargeable batteries, with each battery bound to only one vehicle. That is, each battery can be used by only one vehicle and cannot be provided (e.g., lent) to other vehicles for supplying power thereto, thus limiting usage of the batteries.

SUMMARY

Therefore, the present disclosure aims at providing a solution that is contributive to the provision of rechargeable batteries that each are not limited to being bound to only one electric vehicle, and methods and facilities that enable application of the solution.

An object of the disclosure is to provide a method and a server for managing power supply devices that can alleviate at least one of the drawbacks of the prior art.

According to the disclosure, the method for managing power supply devices is to be implemented by a server, wherein each of the power supply devices has a unique battery identifier. The server is capable of communicating with a user end electronic device and a service end electronic device through a communication network, and stores a plurality of pieces of battery information, each of which corresponds to a different one of the power supply devices and at least includes the battery identifier of the corresponding one of the power supply devices, a user identifier corresponding to a user of the corresponding one of the power supply devices and at least one carrier identifier corresponding to at least one carrier device that is allowed to use the corresponding one of the power supply devices. The method includes steps of: receiving, from the user end electronic device, an alteration request containing a user identifier and a battery identifier; in response to receipt of the alteration request, generating alteration data that relates to a target piece of battery information of the pieces of battery information that includes the user identifier and the battery identifier contained in the alteration request; receiving, from the service end electronic device, an alteration-confirmation signal containing a battery identifier; determining whether the battery identifier contained in the alteration-confirmation signal received from the service end electronic device matches the battery identifier of the target piece of battery information; and sending, when it is determined that the battery identifier contained in the alteration-confirmation signal matches the battery identifier of the target piece of battery information, a confirmation response with respect to the alteration-confirmation signal to the service end electronic device to enable the service end electronic device to send a carrier identifier to one of the power supply devices that corresponds to the battery identifier contained in the alteration-confirmation signal so that the one of the power supply devices is capable of updating data stored therein based on the carrier identifier received from the service end electronic device.

According to the disclosure, the server for managing power supply devices is capable of communicating with a user end electronic device and a service end electronic device through a communication network, wherein each of the power supply devices has a unique battery identifier. The server includes a database storing a plurality of pieces of battery information, each of which corresponds to a different one of the power supply devices and at least includes the battery identifier of the corresponding one of the power supply devices, a user identifier corresponding to a user of the corresponding one of the power supply devices and at least one carrier identifier corresponding to at least one carrier device that is allowed to use the corresponding one of the power supply devices. The server further includes a server end processing module electrically connected to the database. The server end processing module is configured to receive, from the user end electronic device, an alteration request containing a user identifier and a battery identifier. The server end processing module is configured to generate, in response to receipt of the alteration request, alteration data that relates to a target piece of battery information of the pieces of battery information that includes the user identifier and the battery identifier contained in the alteration request. The server end processing module is configured to receive, from the service end electronic device, an alteration-confirmation signal containing a battery identifier. The server end processing module is configured to determine whether the battery identifier contained in the alteration-confirmation signal received from the service end electronic device matches the battery identifier of the target piece of battery information. The server end processing module is further configured to send, when it is determined that the battery identifier contained in the alteration-confirmation signal matches the battery identifier of the target piece of battery information, a confirmation response with respect to the alteration-confirmation signal to the service end electronic device to enable the service end electronic device to send a carrier identifier to one of the power supply devices that corresponds to the battery identifier contained in the alteration-confirmation signal so that the one of the power supply devices is capable of updating data stored therein based on the carrier identifier received from the service end electronic device.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
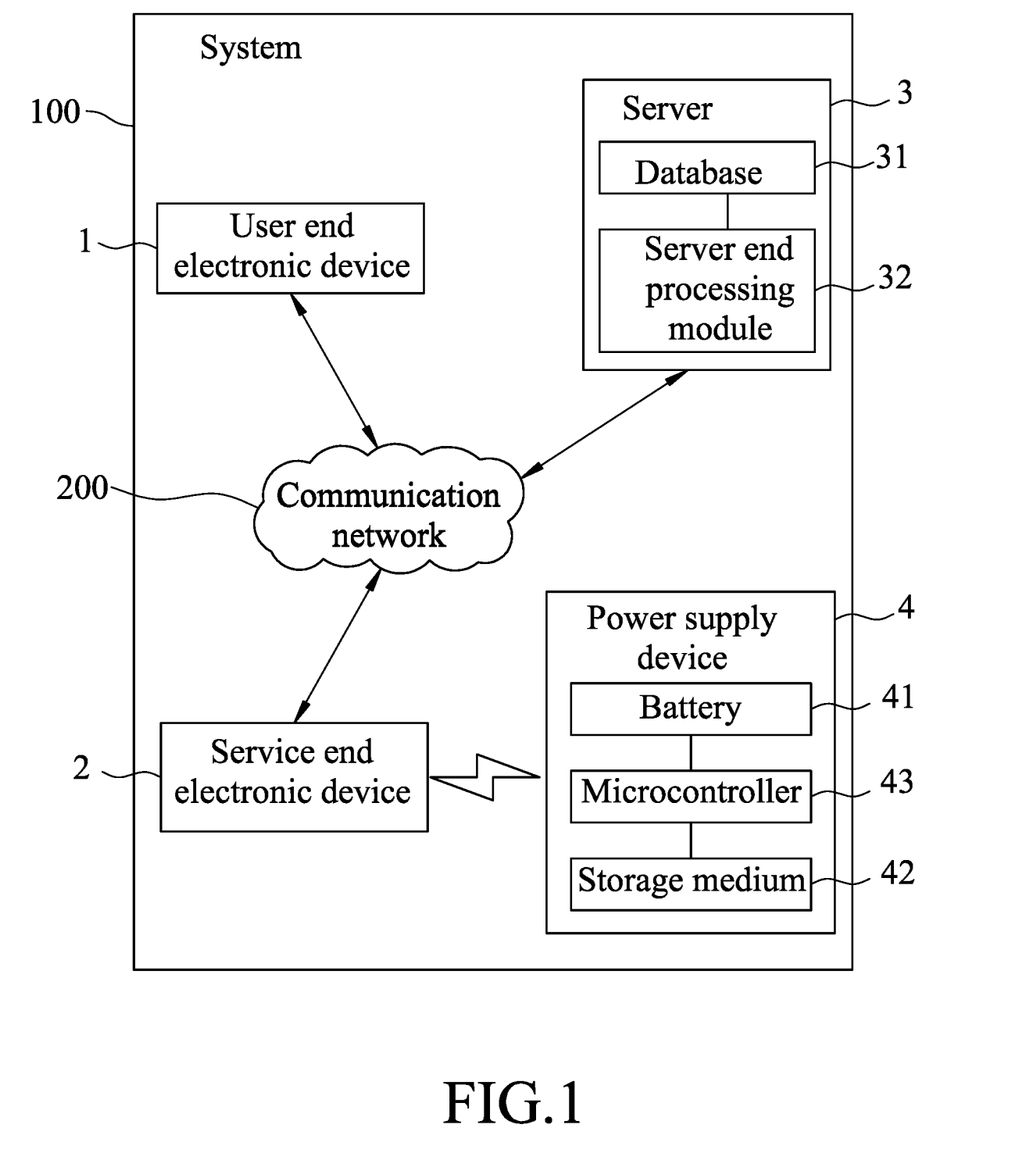
FIG. 1 is a block diagram which exemplarily illustrates a system for managing power supply devices according to an embodiment.

FIG. 1 is a block diagram which exemplarily illustrates a system 100 for managing power supply devices according to an embodiment of this disclosure. Referring to FIG. 1, the system 100 includes a user end electronic device 1, a service end electronic device 2, a server 3 configured to communicate with the user end electronic device 1 and the service end electronic device 2 over a communication network 200 (e.g., the Internet), and a plurality of power supply devices 4 (only one power supply device 4 is illustrated for the sake of simplicity) configured to communicate with the service end electronic device 2 via, for example, near-field communication (NFC). The user end electronic device 1 and the service end electronic device 2 may each be shortened to electronic device in parts of this disclosure. According to some embodiments, the service end electronic device 2 may be a mobile device of an electric vehicle (EV) vendor, and the user end electronic device 1 may be a mobile device of a user/owner of an EV. Each of the user end electronic device 1 and the service end electronic device 2 may be implemented as, for example, an NFC-enabled smart phone or an NEC-enabled tablet computer, but the disclosure is not limited thereto.

According to an embodiment, the server 3 includes a database 31 and a server end processing module 32 electrically coupled to the database 31. The server may be implemented as, for example, a personal computer or a cloud host, but the disclosure is not limited thereto. The server end processing module 32 may be implemented as a processor, a central processing unit (CPU), a digital signal processor (DSP), a system on a chip (SoC) or any other device having computation capability to carry out the functions of the server end processing module 32 of this disclosure.

According to an embodiment, each of the power supply devices 4 has a unique battery identifier. The database 31 of the server 3 stores a plurality of pieces of battery information that each correspond to a different power supply device 4 which has been associated with at least one carrier device (not shown) (i.e., the at least one carrier device that has been allowed to use the power supply device 4). The carrier device is for example an electric vehicle. According to an embodiment, each of the pieces of battery information at least includes the battery identifier of the corresponding power supply device 4, a user identifier corresponding to a user/owner of the corresponding power supply device 4, and at least one carrier identifier of the at least one carrier device allowed to use the corresponding power supply device 4.

According to an embodiment, each of the power supply devices 4 includes a battery 41, storage medium 42 and a microcontroller 43 electrically coupled to the battery 41 and the storage medium 42. The storage medium 42 may be, for example, a memory device. The microcontroller 43 and the storage medium 42 of a power supply device 4 may be cooperatively implemented as a Battery Management System (BMS), but the disclosure is not limited thereto.

According to an embodiment, when a power supply device 4 is associated with at least one carrier device, the battery identifier thereof and at least one carrier identifier of the at least one carrier device are stored in the storage medium 42 of the power supply device 4. According to a variant of this embodiment, when a power supply device 4 is associated with at least one carrier device, its storage medium 42 also stores a corresponding user identifier. In an embodiment, the data stored in the storage medium 42 of a power supply device 4 that is associated with at least one carrier device is the same as the piece of battery information stored in the server 3 that corresponds to the power supply device 4.

Figure 3:
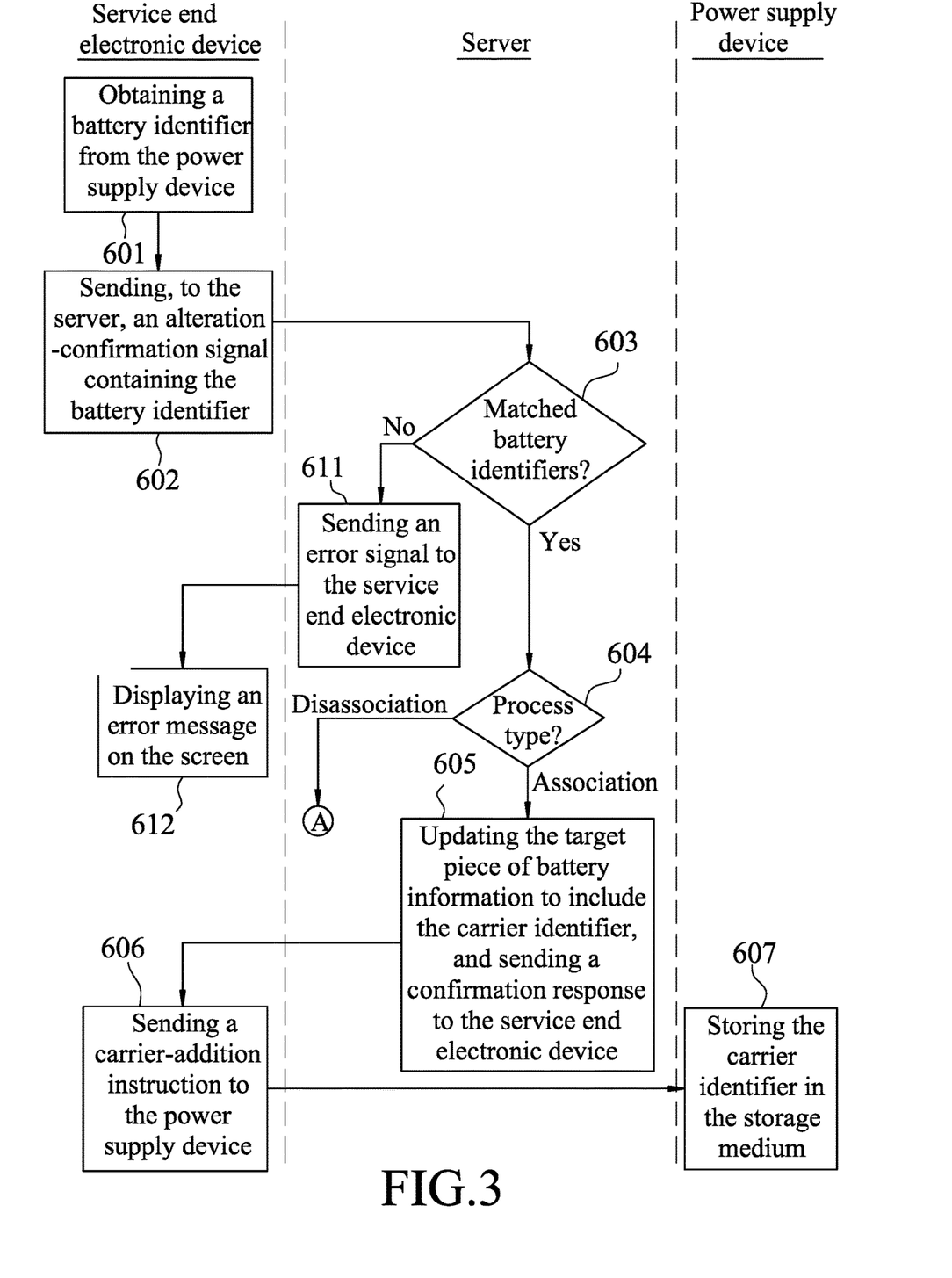
FIG. 3 is a flow chart which exemplarily illustrates a second portion of the first example of the method according to an embodiment.
Figure 4:
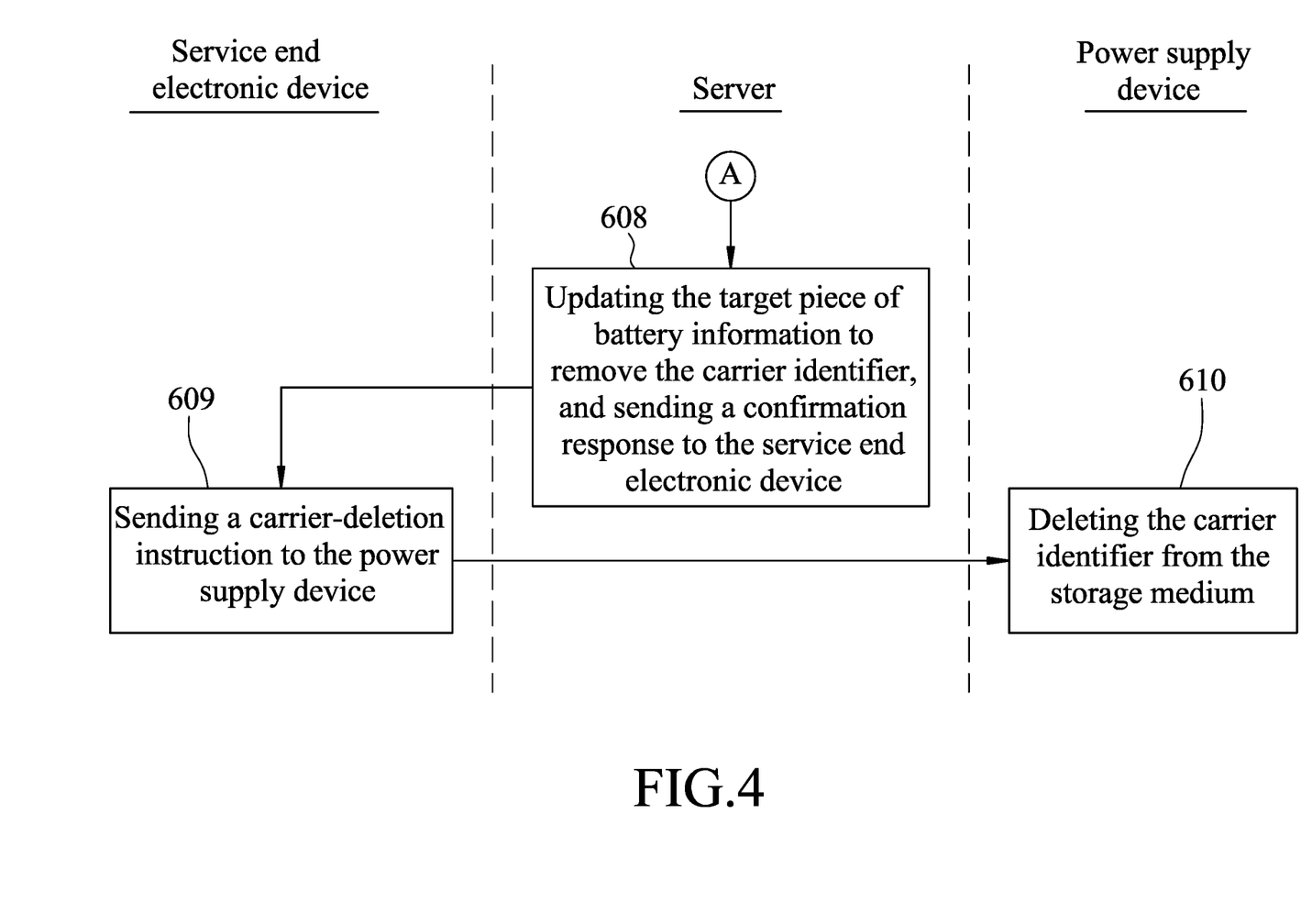
FIG. 4 is a flow chart which exemplarily illustrates a third portion of the first example of the method according to an embodiment.
Figure 5:
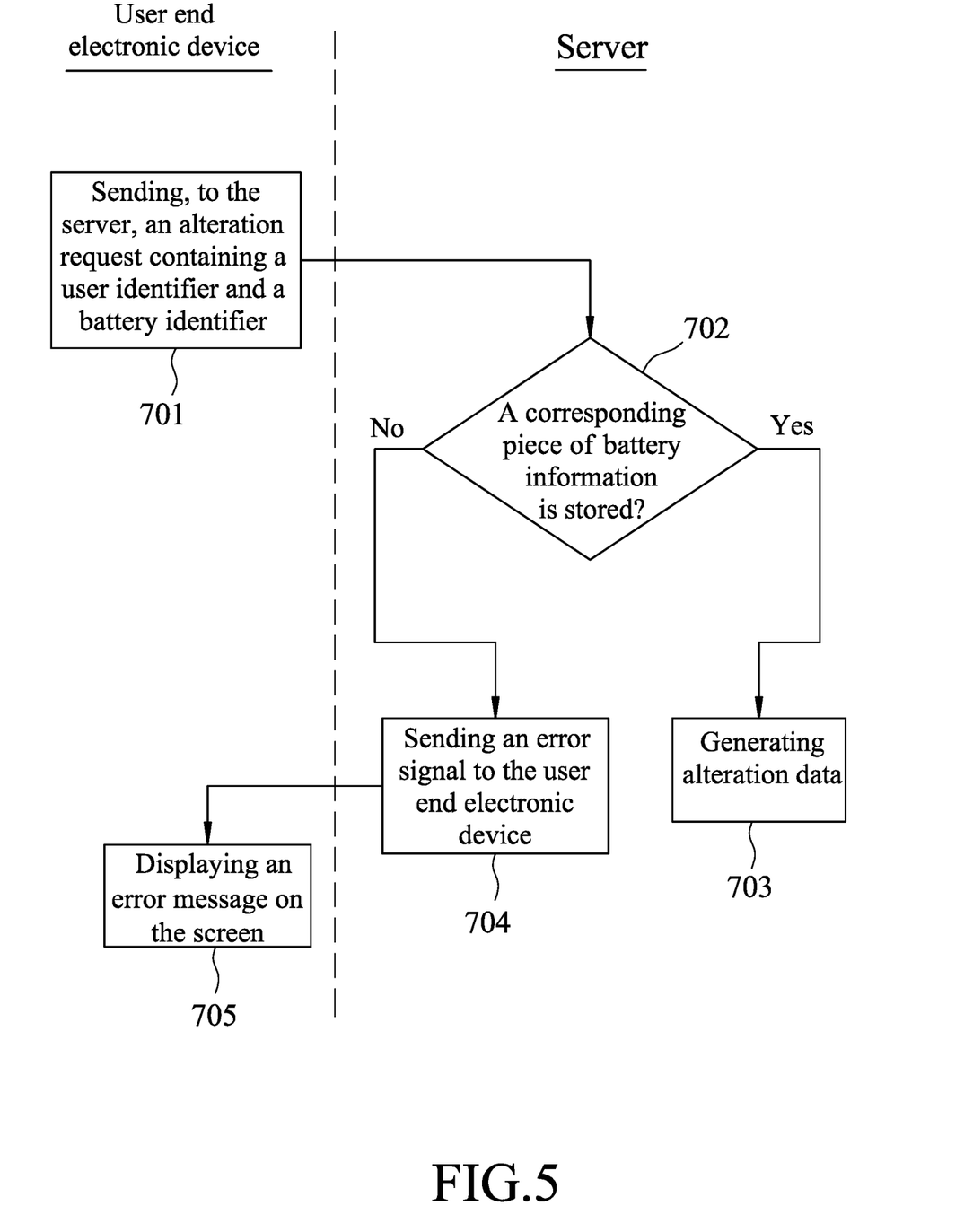
FIG. 5 is a flow chart which exemplarily illustrates a first portion of a second example of the method for managing power supply devices according to an embodiment.
Figure 6:
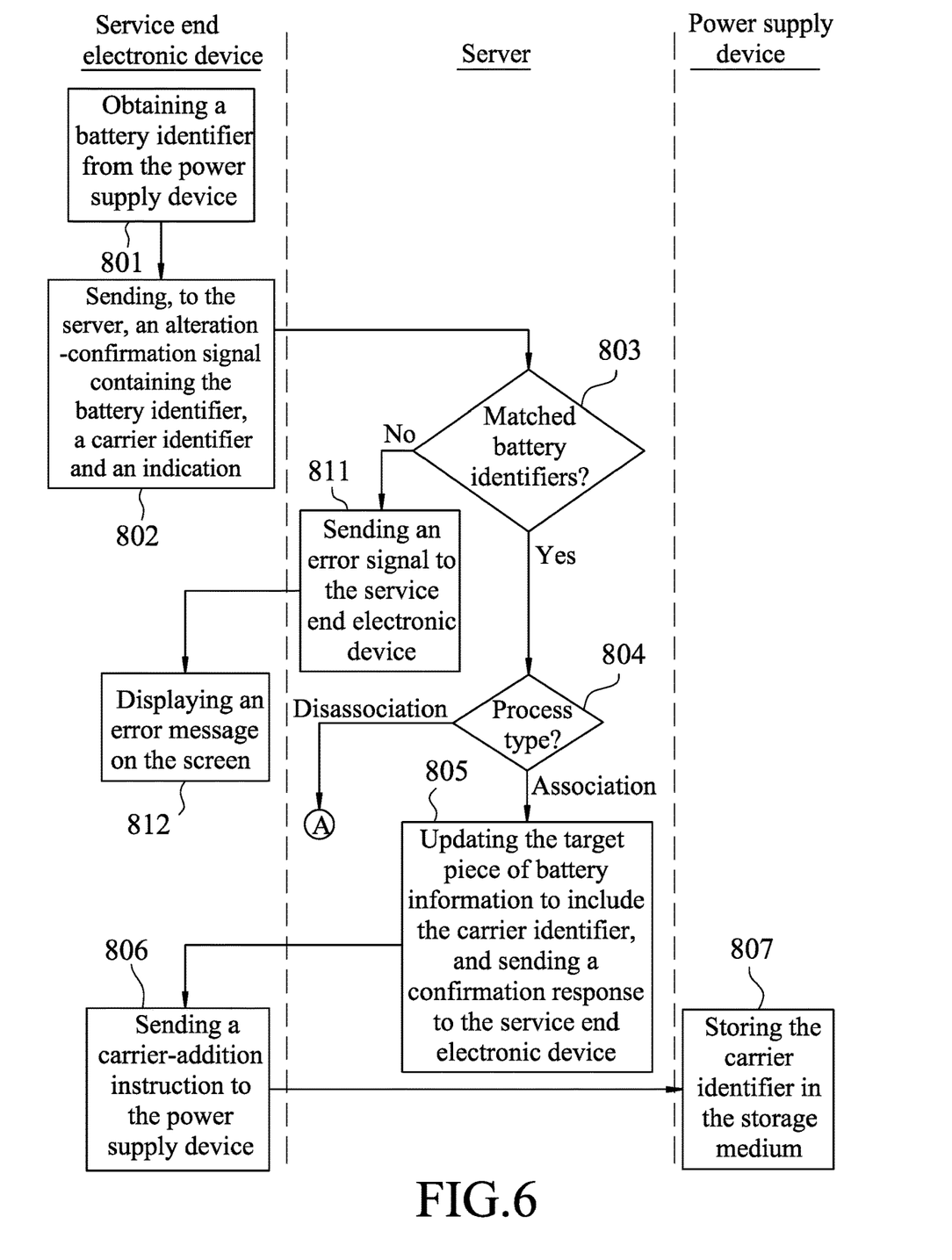
FIG. 6 is a flow chart which exemplarily illustrates a second portion of the second example of the method according to an embodiment.
Figure 7:
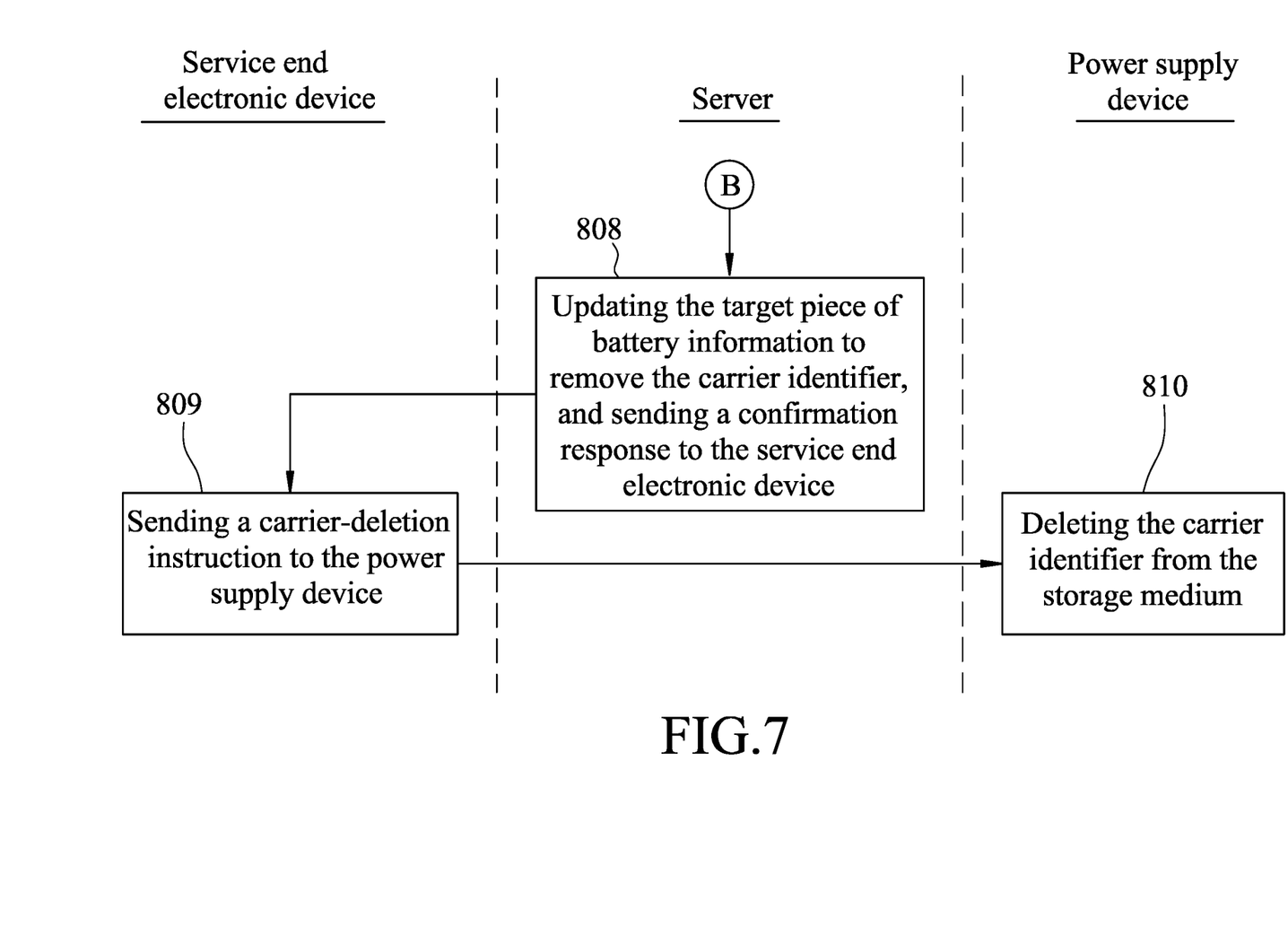
FIG. 7 is a flow chart which exemplarily illustrates a third portion of the second example of the method according to an embodiment.

A method for managing power supply devices may be implemented by the system 100 illustrated in FIG. 1. Each of FIGS. 2-4 illustrates a portion of a first example of the method according to an embodiment of this disclosure, and each of FIGS. 5-7 illustrates a portion of a second example of the method according to another embodiment of this disclosure.

Figure 2:
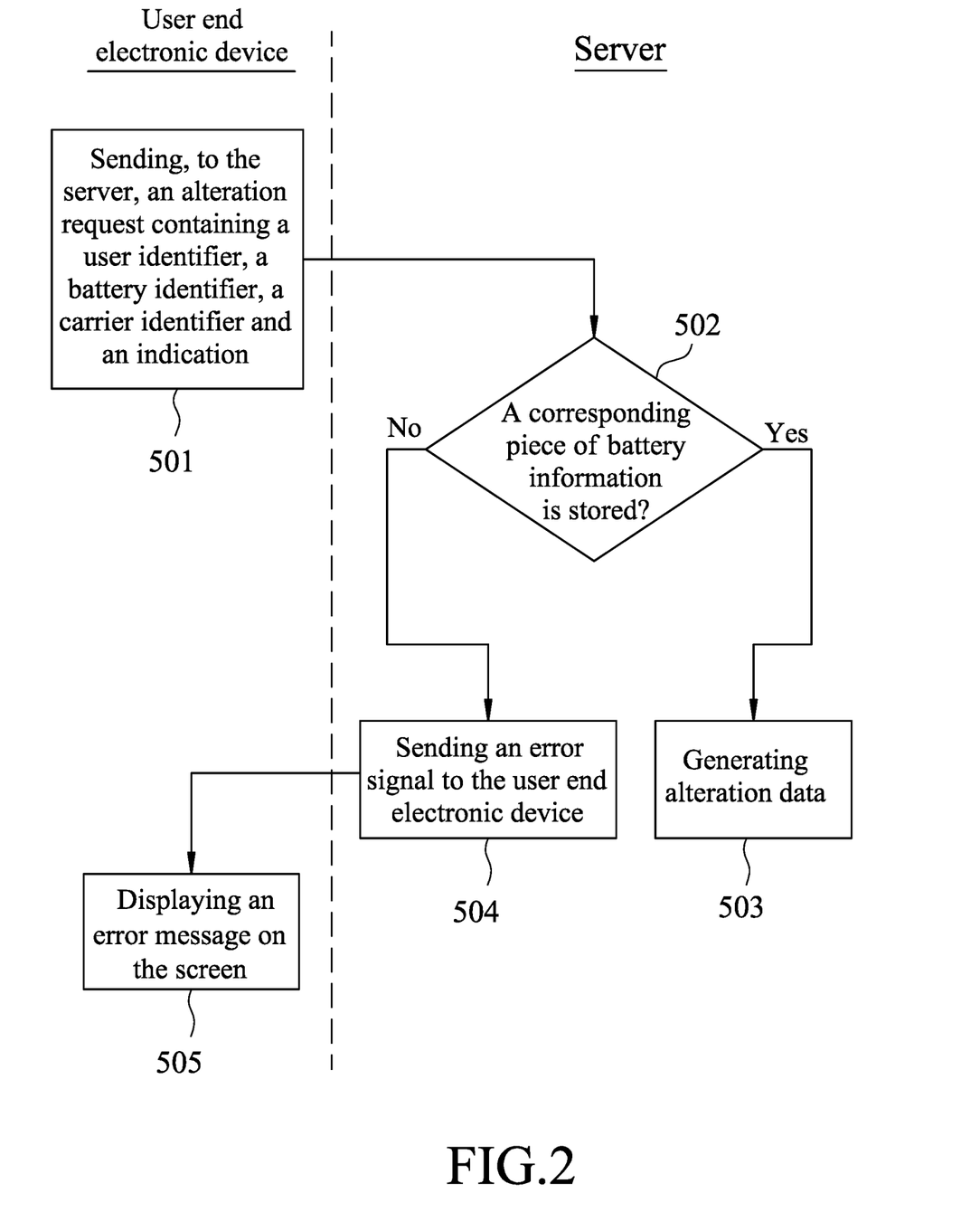
FIG. 2 is a flow chart which exemplarily illustrates a first portion of a first example of a method for managing power supply devices according to an embodiment.

Reference is now made to FIG. 2 which exemplarily illustrates a first portion of the first example of the method for managing power supply devices. This portion of process includes steps 501-505.

In step 501, the user end electronic device 1 generates an alteration request based on an input signal which may be provided by, for example, a user/owner of the user end electronic device 1, and sends the alteration request to the server 3. The alteration request contains a user identifier, a battery identifier corresponding to a target power supply device 4 whose association relationship with a target carrier device is going to be altered (i.e., going to be associated with the target carrier device or to be disassociated from the target carrier device), a carrier identifier of the target carrier device, and an indication of the type of the requested alteration (i.e., whether an association process or a disassociation process is requested by the alteration request). According to an embodiment, the user end electronic device 1 may obtain the carrier identifier by, for example, receiving a user input of the carrier identifier, looking up the license plate number of the target carrier device or scanning a two-dimensional (2D) barcode positioned on the target carrier device, but the disclosure is not limited thereto. In this embodiment, when the target power supply device 4 is associated with the target carrier device, it means that the target power supply device 4 is bound to the target carrier device and is allowed to be used on the target carrier device.

In step 502, the server end processing module 32 receives the alteration request from the user end electronic device 1, and determines whether the database 31 stores apiece of battery information that includes both of the battery identifier and the user identifier contained in the alteration request. If so, the procedure proceeds to step 503. Otherwise, the procedure proceeds to step 504.

In step 503, the server end processing module 32 generates alteration data that relates to the piece of battery information including both of the battery identifier and the user identifier contained in the alteration request (that piece of battery information may be referred to as a target piece of battery information hereafter).

On the other hand, in step 504, the server end processing module 32 sends an error signal to the user end electronic device 1 to indicate that none of the pieces of battery information stored in the database 31 includes both of the battery identifier and the user identifier contained in the alteration request. Then, in step 505, the user end electronic device 1 displays an error message on its screen upon receipt of the error signal from the server end processing module 32.

Reference is now made to FIGS. 3 and 4 which exemplarily illustrate the other two portions of the first example of the method for managing power supply devices. These two portions of process include steps 601-612, and are basically to be performed after step 503 of FIG. 2.

In step 601, the service end electronic device 2 receives information stored in the target power supply device 4 via, for example, near-field communication, and obtains the battery identifier of the target power supply device 4 from the received information.

In step 602, the service end electronic device 2 generates an alteration-confirmation signal containing the battery identifier of the target power supply device 4, and sends the alteration-confirmation signal to the server 3.

One of ordinary skill in the relevant art would appreciate that it is not necessary for steps 601 and 602 to be performed after step 503 of FIG. 2. Specifically, the sequence of steps 601 and 602 may start and/or end earlier than, simultaneously with, or later than the sequence of steps 501-503. Further, in an embodiment in which a user identifier is stored in the storage medium 42 of the target power supply device 4, the service end electronic device 2 obtains not only the battery identifier but also the user identifier from the target power supply device 4 in step 601, and the alteration-confirmation signal generated in step 602 further contains the user identifier thus obtained.

In step 603, the server end processing module 32 determines whether the battery identifier contained in the alteration-confirmation signal received from the service end electronic device 2 is identical to (i.e., matches) the battery identifier included in the target piece of battery information that relates to the alteration data generated in step 503 of FIG. 2. If so, the procedure proceeds to step 604. Otherwise, the procedure proceeds to step 611. In an embodiment in which the alteration-confirmation signal contains a user identifier in addition to the battery identifier, the server end processing module 32 further determines whether the user identifier contained in the alteration-confirmation signal is identical to the user identifier included in the target piece of battery information, and the procedure proceeds to step 604 only when both of the battery identifier and the user identifier contained in the alteration-confirmation signal are identical to those included in the target piece of battery information.

In step 611, the server end processing module 32 sends an error signal to the service end electronic device 2. Then, in step 612, the service end electronic device 2 displays an error message on its screen upon receipt the error signal from the server end processing module 32.

On the other hand, in step 604, the server end processing module 32 determines whether an association process or a disassociation process is requested by the alteration request based on the indication contained therein. If an association process is requested, the procedure proceeds to step 605; if a disassociation process is requested, the procedure proceeds to step 608.

In step 605, the server end processing module 32 updates the target piece of battery information stored in the database 31 to include the carrier identifier contained in the alteration request, generates a confirmation response, which contains an association instruction and the carrier identifier, with respect to the alteration-confirmation signal, and sends the confirmation response to the service end electronic device 2.

In step 606, the service end electronic device 2 receives the confirmation response from the server 3. Then, the service end electronic device 2 generates, according to the carrier identifier and the association instruction contained in the received confirmation response, a carrier-addition instruction which contains the carrier identifier contained in the confirmation response, and sends the carrier-addition instruction to the target power supply device 4 via, for example, near-field communication.

In step 607, the microcontroller 43 of the target power supply device 4 receives the carrier-addition instruction from the service end electronic device 2, and stores, in its storage medium 42, the carrier identifier contained in the carrier-addition instruction. In this case, the target carrier device is now allowed to use the target power supply device 4.

On the other hand, in step 608, the server end processing module 32 updates the target piece of battery information stored in the database 31 to remove, from the target piece of battery information, the carrier identifier contained in the alteration request, generates a confirmation response, which contains a disassociation instruction and the carrier identifier, with respect to the alteration-confirmation signal, and sends the confirmation response to the service end electronic device 2.

In step 609, the service end electronic device 2 receives the confirmation response from the server 3. Then, the service end electronic device 2 generates, according to the carrier identifier and the disassociation instruction contained in the received confirmation response, a carrier-deletion instruction which contains the carrier identifier contained in the confirmation response, and sends the carrier-deletion instruction to the target power supply device 4 via, for example, near-field communication.

In step 610, the microcontroller 43 of the target power supply device 4 receives the carrier-deletion instruction from the service end electronic device 2, and deletes, from its storage medium 42, the carrier identifier contained in the carrier-deletion instruction. In this case, the target carrier device is now forbidden to use the target power supply device 4.

A second example of the method for managing power supply devices that may be implemented by the system 100 illustrated in FIG. 1 is illustrated in FIGS. 5-7. As is evident from FIGS. 2-7, the second example is similar to the first one in great measure. A major difference between these two examples is that in the second example, the carrier identifier of the target carrier device and the indication of the type of requested alteration are provided by the service end electronic device 2, rather than provided by the user end electronic device 1 as in the first example. The following description of the second example will focus on parts different from the first example, without repeating details that have been described above with respect to the first example.

Reference is now made to FIG. 5 which exemplarily illustrates a first portion of the second example of the method for managing power supply devices. This portion of process includes steps 701-705.

In step 701, the user end electronic device 1 similarly generates an alteration request based on an input signal, and sends the alteration request to the server 3. The generated alteration request contains a user identifier and a battery identifier corresponding to a target power supply device 4.

The following steps 702-705 are the same as steps 502-505. In short, in step 702, the server end processing module 32 determines whether the database 31 stores a piece of battery information that includes both of the battery identifier and the user identifier contained in the alteration request. If so, the procedure proceeds to step 703 where the server end processing module 32 generates alteration data relating to the piece of battery information that includes both of the battery identifier and the user identifier contained in the alteration request (i.e., the target piece of battery information). Otherwise, the procedure proceeds to step 704 where the server end processing module 32 sends an error signal to the user end electronic device 1, and then to step 705 where the user end electronic device 1 displays an error message on its screen upon receipt of the error signal.

Reference is now made to FIGS. 6 and 7 which exemplarily illustrate the other two portions of the second example of the method for managing power supply devices. These two portions of process include steps 801-802.

Step 801 is the same as step 601 where the service end electronic device 2 obtains at least the battery identifier of the target power supply device 4 from the target power supply device 4.

Then, in step 802, the service end electronic device 2 generates an alteration-confirmation signal, and sends the alteration-confirmation signal to the server 3. The alteration-confirmation signal at least contains the battery identifier of the target power supply device 4, a carrier identifier of a target carrier device, and an indication of the type of a confirmed alteration (i.e., whether an association process or a disassociation process is confirmed by the alteration-confirmation signal). According to an embodiment, the service end electronic device 2 may obtain the carrier identifier by, for example, receiving a user input of the carrier identifier, looking up the license plate number of the target carrier device or scanning a two-dimensional (2D) barcode positioned on the target carrier device, but the disclosure is not limited thereto.

The following step 803 is the same as step 603, where the server end processing module 32 determines at least whether the battery identifier contained in the alteration-confirmation signal received from the service end electronic device 2 is identical to the battery identifier included in the target piece of battery information relating to the alteration data generated in step 703. If so, the procedure proceeds to step 804. Otherwise, the procedure proceeds to steps 811 and 812 that are the same as steps 611 and 612, where the server end processing module 32 sends an error signal to the service end electronic device 2, and the service end electronic device 2 displays an error message on its screen.

In step 804, the server end processing module 32 determines whether the indication contained in the alteration-confirmation signal indicates an association process or a disassociation process. If an association process is indicated, the procedure proceeds to step 805; if a disassociation process is indicated, the procedure proceeds to step 808.

In step 805, the server end processing module 32 updates the target piece of battery information stored in the database 31 to include the carrier identifier contained in the alteration-confirmation signal, generates a confirmation response, which contains an association instruction and the carrier identifier, with respect to the alteration-confirmation signal, and sends the confirmation response to the service end electronic device 2.

Steps 806 and 807 following step 805 are the same as steps 606 and 607, where the service end electronic device 2 sends, to the target power supply device 4, a carrier-addition instruction containing the carrier identifier contained in the confirmation response, and the target power supply device 4 stores, in its storage medium 42, the carrier identifier contained in the carrier-addition instruction.

On the other hand, in step 808, the server end processing module 32 updates the target piece of battery information stored in the database 31 to remove, from the target piece of battery information, the carrier identifier contained in the alteration-confirmation signal, generates a confirmation response, which contains a disassociation instruction and the carrier identifier, with respect to the alteration-confirmation signal, and sends the confirmation response to the service end electronic device 2.

Steps 809 and 810 following step 808 are the same as steps 609 and 610, where the service end electronic device 2 sends, to the target power supply device 4, a carrier-deletion instruction containing the carrier identifier contained in the confirmation response, and the target power supply device 4 deletes, from its storage medium 42, the carrier identifier contained in the carrier-deletion instruction.

To sum up, in the method for managing power supply devices as disclosed above, with cooperation of a user end electronic device, a service end electronic device and the server, the settings of a power supply device may be conveniently altered to allow more carrier devices to use the power supply device or to remove accessibility of a carrier device to the power supply device. As can be seen from the above, the disclosed method includes a first confirmation mechanism implemented by step 502 or 702 that checks the validity of an alteration request from the user end electronic device (e.g., checking whether the target power supply device belongs to the user who is making the request). The disclosed method further includes a second confirmation mechanism implemented by step 603 or 803 that checks whether the battery identifier contained in the alteration request submitted by the user end electronic device matches the battery identifier of the target power supply device brought to the service end (e.g., the EV vendor). Therefore, the disclosed method effectively enables plural carrier devices to safely share a same power supply device, thus improving usage of the power supply device.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for managing power supply devices that is to be implemented by a server in communication with a user end electronic device and a service end electronic device over a communication network, each of the power supply devices having a unique battery identifier, the server storing a plurality of pieces of battery information, each of which corresponds to a different one of the power supply devices and at least includes the battery identifier of the corresponding one of the power supply devices, a user identifier corresponding to a user of the corresponding one of the power supply devices and at least one carrier identifier corresponding to at least one carrier device that is allowed to use the corresponding one of the power supply devices, the method comprising steps of:

receiving, from the user end electronic device, an alteration request containing a user identifier, a battery identifier and a carrier identifier;

in response to receipt of the alteration request, generating alteration data that relates to a target piece of battery information of the pieces of battery information that includes the user identifier and the battery identifier contained in the alteration request;

receiving, from the service end electronic device, an alteration-confirmation signal containing a battery identifier and the carrier identifier;

determining whether the battery identifier contained in the alteration-confirmation signal received from the service end electronic device matches the battery identifier of the target piece of battery information; and when it is determined that the battery identifier contained in the alteration-confirmation signal matches the battery identifier of the target piece of battery information, sending, to the service end electronic device, a confirmation response with respect to the alteration-confirmation signal to enable the service end electronic device to send the carrier identifier to one of the power supply devices that corresponds to the battery identifier contained in the alteration-confirmation signal so that the one of the power supply devices is capable of updating data stored therein based on the carrier identifier received from the service end electronic device.

2. The method of claim 1, wherein
the step of sending a confirmation response includes:
generating the confirmation response to contain the carrier identifier contained in the alteration request; and
sending the confirmation response to the service end electronic device to enable the service end electronic device to acquire the carrier identifier from the confirmation response.

3. The method of claim 2, further comprising a step of:
when it is determined that the battery identifier contained in the alteration-confirmation signal matches the battery identifier of the target piece of battery information, updating the target piece of battery information based on the carrier identifier contained in the alteration request.

4. The method of claim 1, further comprising a step of:
when it is determined that the battery identifier contained in the alteration-confirmation signal matches the battery identifier of the target piece of battery information, updating the target piece of battery information based on the carrier identifier contained in the alteration-confirmation signal.

5. A server capable of communicating with a user end electronic device and a service end electronic device over a communication network for managing power supply devices, each of the power supply devices having a unique battery identifier, the server comprising:

a database storing a plurality of pieces of battery information, each of which corresponds to a different one of the power supply devices and at least includes the battery identifier of the corresponding one of the power supply devices, a user identifier corresponding to a user of the corresponding one of the power supply devices and at least one carrier identifier corresponding to at least one carrier device that is allowed to use the corresponding one of the power supply devices; and a server end processing module electrically connected to said database, and configured to receive, from the user end electronic device, an alteration request containing a user identifier, a battery identifier and a carrier identifier;

in response to receipt of the alteration request, generate alteration data that relates to a target piece of battery information of the pieces of battery information that includes the user identifier and the battery identifier contained in the alteration request;

receive, from the service end electronic device, an alteration-confirmation signal containing a battery identifier and the carrier identifier;

determine whether the battery identifier contained in the alteration-confirmation signal received from the service end electronic device matches the battery identifier of the target piece of battery information; and when it is determined that the battery identifier contained in the alteration-confirmation signal matches the battery identifier of the target piece of battery information, send, to the service end electronic device, a confirmation response with respect to the alteration-confirmation signal to enable the service end electronic device to send the carrier identifier to one of the power supply devices that corresponds to the battery identifier contained in the alteration-confirmation signal so that the one of the power supply devices is capable of updating data stored therein based on the carrier identifier received from the service end electronic device.

6. The server of claim 5, wherein
the confirmation response to be sent to the service end electronic device contains the carrier identifier.

7. The server of claim 6, wherein said server end processing module is further configured to
when it is determined that the battery identifier contained in the alteration-confirmation signal matches the battery identifier of the target piece of battery information, update the target piece of battery information based on the carrier identifier contained in the alteration request.

8. The server of claim 5, wherein said server end processing module is further configured to:
when it is determined that the battery identifier contained in the alteration-confirmation signal matches the battery identifier of the target piece of battery information, update the target piece of battery information based on the carrier identifier contained in the alteration-confirmation signal.

* * * * *